Nov. 26, 1935.　　　　F. L. GRIER　　　　2,021,890
NOSE PAD FOR EYEGLASSES AND METHOD OF MAKING SAME
Filed April 26, 1934
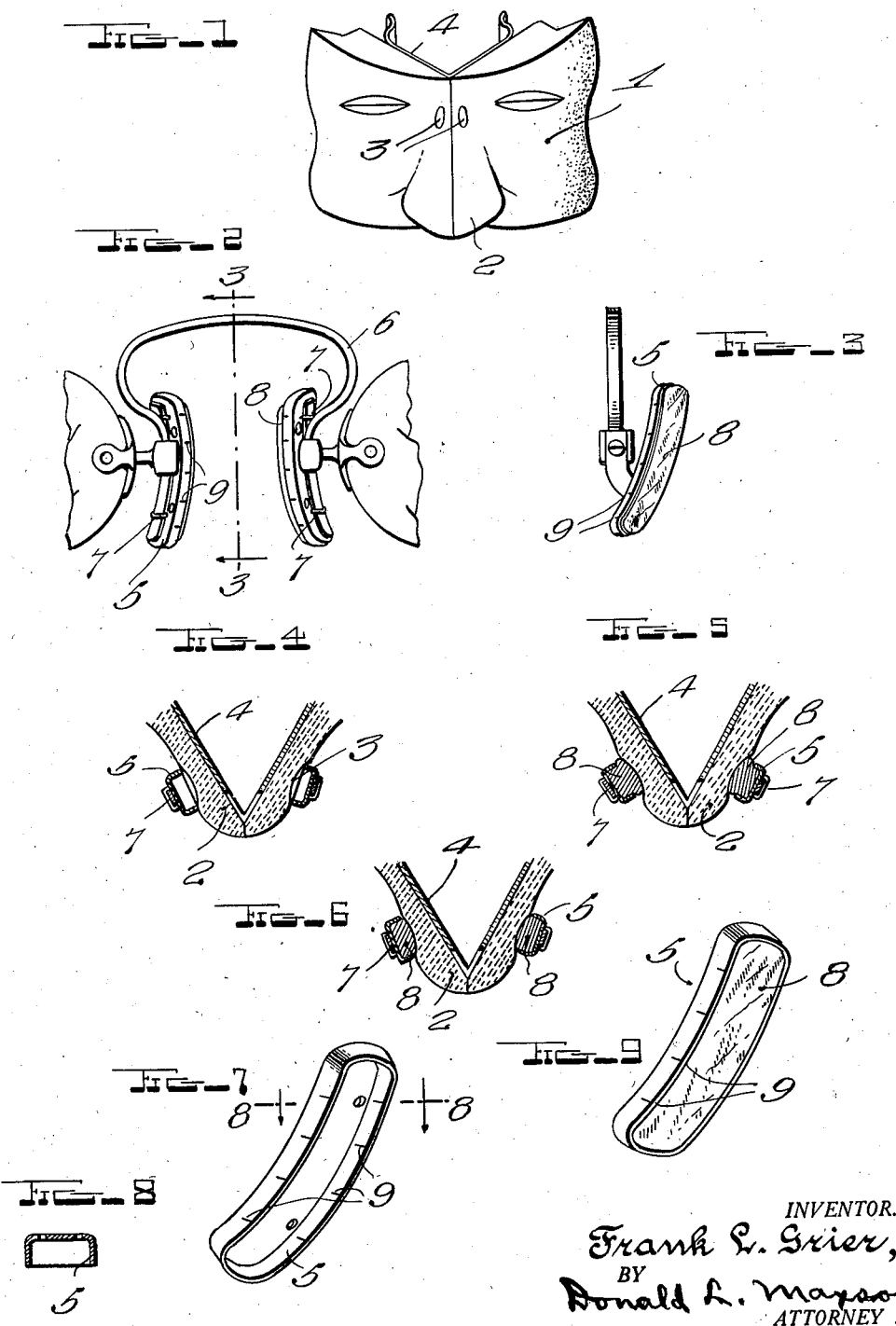
INVENTOR.
Frank L. Grier,
BY Donald L. Mapson.
ATTORNEY.

Patented Nov. 26, 1935

2,021,890

UNITED STATES PATENT OFFICE 2,021,890

NOSE PAD FOR EYEGLASSES AND METHOD OF MAKING SAME

Frank L. Grier, Milford, Del.

Application April 26, 1934, Serial No. 722,558

5 Claims. (Cl. 88—48)

This invention relates to improvements in eyeglasses, and more particularly to nose pads therefor, and to the method in which the same are formed and fitted.

An object of the invention is to provide a novel method of fitting nose pads of eyeglasses to the wearer's nose, so that they will exactly fit into the indentations or depressions found at the opposite sides of the nose bridge of persons wearing pince nez glasses, and when the improved nosepads are made, the same will positively and correctly grip the sides of the nose so that the glasses will be retained in firm position thereon.

Another object of the invention is to provide a novel method of fitting glasses on a person's nose, by first fitting a pair of glasses employing hollow nose pad shells thereby making an impression at the opposite sides of the nose bridge, after which the pad shells may be filled with a plastic material in workable form, and the glasses again placed on the nose in their proper position. The plastic material when hardened will have assumed the shape of the surface indentations or depressions found at the opposite sides of the nose, and the surface of the material will be roughened by the impression of the skin lines. The excess plastic material may then be removed and the pads polished.

A further object of the invention is to provide an improved nose pad for eyeglasses which will comprise a hollow shell provided with an annular flange which is notched at intervals, and which will be filled with a plastic material to form the nose engaging portion of the pad, said plastic material being held in said shell by filling in the notched spaces in the shell wall.

Other objects will appear as the description proceeds.

In the accompanying drawing which forms a part of my application,

Figure 1 is a perspective view of my improved mold or cast upon which eyeglasses and spectacles are fitted;

Figure 2 is an enlarged detail view of a pair of eyeglasses with my improved nose pad shells in position thereon;

Figure 3 is a sectional view taken on the line 3—3 of Figure 2;

Figure 4 is a fragmentary sectional view of the nose portion of the mask with pad shells in position and pads removed;

Figure 5 is a similar view to Figure 4, but with the plastic material from which the pads are formed, in position within the pad shells;

Figure 6 is a similar view to Figure 5, but showing the excess plastic material removed from the shells, and the shells and pads in finished form;

Figure 7 is a perspective view of one of my improved nose pad shells;

Figure 8 is a sectional view taken on the line 8—8 of Figure 7, and

Figure 9 is a perspective view of the completed shell with plastic material nose pad in position therein.

Like characters of reference are used throughout the following specification and the accompanying drawing to designate corresponding parts.

In carrying out my invention, I provide a cast or mask of the face of a person to be fitted with eyeglasses, as illustrated in Figure 1 of the drawing, said mask having formed at the opposite sides of the nose portion, the depressions or indentations found at the opposite sides of the nose bridge of persons who wear eyeglasses.

The mask 1 is provided with the nose 2, and indentations 3 at the opposite sides of the nose bridge. A resilient member for manipulating the mask is shown at 4.

When a pair of pince nez eyeglasses are to be fitted, the same are provided with the hollow nose pad shells 5, which are suitably supported upon the bridge 6 of the eyeglasses, as by the clips 7, although any suitable fastening means may be employed for this purpose. The eyeglasses are then placed upon the nose, as shown in Figure 4, and are fitted as to the proper tension and position, etc. After this first fitting is completed, a batch of plastic material is mixed upon a slab, and the shells 5 filled with an excess amount of the material, and then the eyeglasses are again placed upon the nose 2, and permitted to remain thereon, until the plastic material 8 has hardened on the slab. The eyeglasses are then removed from the mask, and the excess of material, which has now hardened, may be removed, and the shells and edges of the material polished to make the completed or finished nose shell and pad.

From Figures 7 and 9, it will be apparent that I have notched the wall of the shell 5 at intervals, as indicated at 9, the purpose of which is to allow the plastic material 8 to fill in the spaces formed by the said notches, and thereby more firmly fasten the plastic pad in position within the shell. Another purpose of the notched wall, is to permit the more perfect fitting of the shell upon the nose. It will be further apparent, that when the plastic material has hardened within the shells, there will be formed in the surface of the material, similar lines and markings which appear in the depressions at the opposite sides of the nose bridge of the person who is to wear the eyeglasses. Hence, there will be a means for positive engagement between the nose pads and the nose, which will hold the eyeglasses in their proper position and free from slipping.

Many minor changes in detail of construction may be resorted to without departure from the spirit of the invention.

Having thus described my invention what I claim as new and desire to secure by Letters Patent of the United States is:

1. A nose pad for eyeglasses formed of hardened material having depressions and ridges on its surface complemental to the depressions and ridges in that portion of the nose of the wearer which the pad is designed to fit.

2. A nose pad for eyeglasses comprising a hollow shell formed with a notched edge and filled with a hardened material having depressions and ridges on its surface complemental to the depressions and ridges in that portion of the nose of the wearer which the pad is designed to fit.

3. A nose pad having a preformed surface roughened complemental to that portion of the natural external surface of the nose of the wearer which the pad is designed to fit.

4. The method of forming nose pads for eyeglasses provided with pad shells comprising first applying the eyeglasses with pad shells to the nose of the ultimate wearer and contouring the shells to the nose of said wearer, thereafter removing the eyeglasses and filling the shells with a surplus of self-hardening material, subsequently again applying the eyeglasses to the nose of said wearer and pressing said pads while so filled on the nose while the eyeglasses are in position of use.

5. The subject matter as claimed in claim 2, and means on said pad shells for attaching the same to a pair of eyeglasses.

FRANK L. GRIER.